(12) United States Patent
Bradley et al.

(10) Patent No.: US 8,814,740 B2
(45) Date of Patent: Aug. 26, 2014

(54) TWO-SPEED POWER TAKE-OFF UNIT WITH MODE CLUTCH

(71) Applicants: Douglas Bradley, Sterling Heights, MI (US); Todd Ekonen, Howell, MI (US)

(72) Inventors: Douglas Bradley, Sterling Heights, MI (US); Todd Ekonen, Howell, MI (US)

(73) Assignee: Magna Powertrain of America, Inc., Troy, MI (US)

( * ) Notice: Subject to any disclaimer, the term of this patent is extended or adjusted under 35 U.S.C. 154(b) by 0 days.

(21) Appl. No.: 13/845,618

(22) Filed: Mar. 18, 2013

(65) Prior Publication Data

US 2013/0247695 A1    Sep. 26, 2013

Related U.S. Application Data

(63) Continuation of application No. 12/375,273, filed as application No. PCT/US2007/016819 on Jul. 26, 2007, now Pat. No. 8,403,795.

(60) Provisional application No. 60/834,862, filed on Aug. 2, 2006.

(51) Int. Cl.
*F16H 37/08* (2006.01)

(52) U.S. Cl.
USPC .......................................... 475/204

(58) Field of Classification Search
None
See application file for complete search history.

(56) References Cited

U.S. PATENT DOCUMENTS

| | | | |
|---|---|---|---|
| 4,207,780 | A | 6/1980 | Saxton |
| 4,779,699 | A | 10/1988 | Hatano |
| 5,106,351 | A | 4/1992 | Williams et al. |
| 5,651,748 | A | 7/1997 | Adam et al. |
| 6,668,961 | B2 | 12/2003 | Bowen et al. |
| 6,843,750 | B1 | 1/2005 | Bennett |
| 7,189,179 | B2 | 3/2007 | Williams et al. |
| 7,278,946 | B2 | 10/2007 | Williams et al. |
| 2004/0214688 | A1 | 10/2004 | Takasaki et al. |
| 2007/0049451 | A1 | 3/2007 | Mizon et al. |

FOREIGN PATENT DOCUMENTS

DE            4118266            12/1991

*Primary Examiner* — Erin D Bishop
(74) *Attorney, Agent, or Firm* — Dickinson Wright, PLLC

(57) ABSTRACT

A two-speed power take-off unit adapted for installation in an all-wheel drive vehicle having a transversely mounted engine/transaxle powertrain. The two-speed power take-off unit includes a planetary gear reduction unit capable of establishing a high-range and a low-range drive connection between the powertrain and a transfer assembly. The transfer assembly provides drive torque to a front differential assembly driving the front wheels and a PTU gearset driving the rear wheels.

30 Claims, 7 Drawing Sheets

TWO-SPEED POWER TAKE-OFF UNIT WITH MODE CLUTCH

CROSS-REFERENCE TO RELATED APPLICATIONS

This application is a continuation of U.S. patent Ser. No. 12/375,273 filed on Jan. 27, 2009 which is a 371 U.S. national phase of International Application No. PCT/US2007/016819 filed Jul. 26, 2007 which claims the benefit of U.S. Provisional Application No. 60/834,862 filed on Aug. 2, 2006. The entire disclosure of each of the above applications is incorporated herein by reference.

BACKGROUND

The present disclosure relates generally to power take-off units for use in motor vehicles. More particularly, the present disclosure relates to the incorporation of a two-speed gear reduction unit into the torque path of a power take-off unit.

Currently, front wheel drive vehicles with all-wheel drive (AWD) capabilities are growing in the marketplace as the need for more utility from these types of vehicles is increasing. This need for increased utility has warranted the ability to increase the drive torque transferred to all four wheels during certain situations. Furthermore, because of the increase in consumer popularity of all-wheel drive vehicles for everyday use, various design strategies have been implemented to reduce manufacturing cost. While such strategies generally work in a satisfactory manner, the need exists for an improved power take-off unit that can be integrated into conventional front-wheel drive vehicle architectures.

SUMMARY OF THE INVENTION

The present disclosure relates to a power take-off unit for use in a motor vehicle having a transversely-mounted powertrain and sets of first and second wheels. The power take-off unit includes an input shaft driven by the powertrain, a pair of axleshafts driving the first wheels, and a pinion shaft driving the second wheels. The power take-off unit further includes a two-speed gear reduction unit driven by the input shaft, a differential assembly interconnecting the pair of axleshafts, a hypoid gearset driving the pinion shaft, and a transfer assembly driving the differential assembly and the hypoid gearset. The two-speed gear reduction unit is operably disposed in the torque path between the input shaft and the transfer assembly for establishing first and second speed ratio drive connections therebetween.

In accordance with one object of the present disclosure, the two-speed reduction unit includes a planetary gearset and a clutch operable to couple the transfer assembly to one of the input shaft and the planetary gearset so as to establish high-range and low-range drive connections between the input shaft and the transfer assembly.

In accordance with another object of the present disclosure, the two-speed reduction unit includes a pair of constant-mesh gearsets and a synchronized clutch operable to couple the transfer assembly to the gearsets so as to establish high-range and low-range drive connections between the input shaft and the transfer assembly.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The disclosure will now be described, by way of example, with reference to the accompanying drawings in which.

DETAILED DESCRIPTION OF THE PREFERRED EMBODIMENTS

The present disclosure is directed to a power take-off unit for use in a motor vehicle equipped with a transversely mounted engine and transmission and which may be arranged to provide a full-time or part-time four-wheel drive mode of operation. The right-angled design provides a compact package which permits use of the power take-off unit in a wide variety of vehicles.

Figure 1:
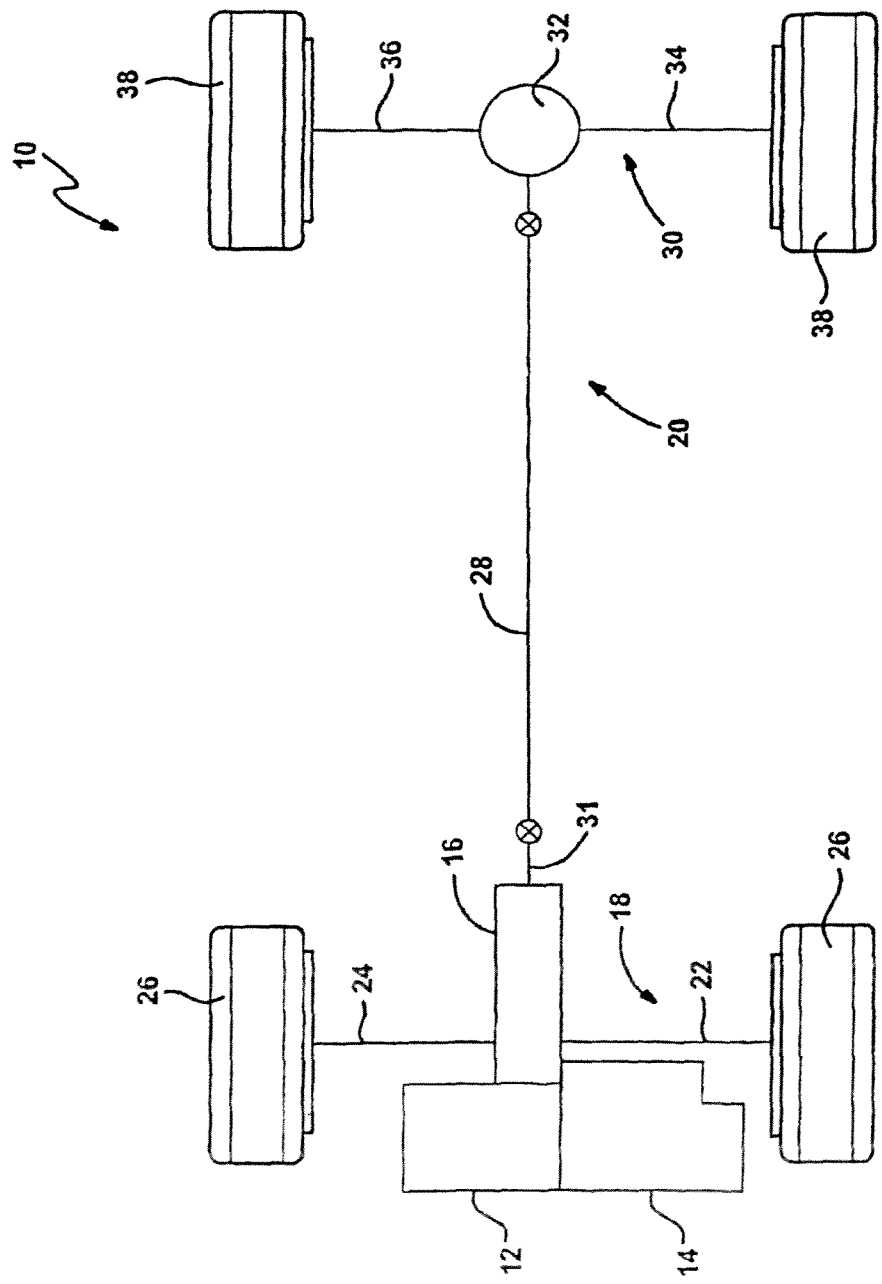
FIG. 1 is a schematic illustrating the drivetrain of an all-wheel drive motor vehicle equipped with a two-speed power take-off unit of the present disclosure.

With particular reference to FIG. 1, a schematic of an all-wheel drive (AWD) motor vehicle 10 is shown to include a powertrain having a transversely-mounted engine 12 and a transmission 14 adapted to deliver motive power (i.e., drive torque) to the input of a power take-off unit (PTU) 16. PTU 16 is adapted for use in full-time or part-time all-wheel drive systems and is operable to transfer drive torque to a front driveline 18 and a rear driveline 20. Front driveline 18 includes a first or left half-shaft 22 and a second or right half-shaft 24. Front half-shafts 22 and 24 are connected to a pair of ground-engaging front wheels 26. Rear driveline 20 includes a driveshaft 28 and a rear axle assembly 30. One end of driveshaft 28 is connected to an output member 31 of PTU 16 and its opposite and is connected to a rear differential 32 associated with rear axle assembly 30. Rear axle assembly 30 further includes a pair of axleshafts 34 and 36 which connect a pair of ground-engaging rear wheels 38 to rear differential 32.

Figure 2:
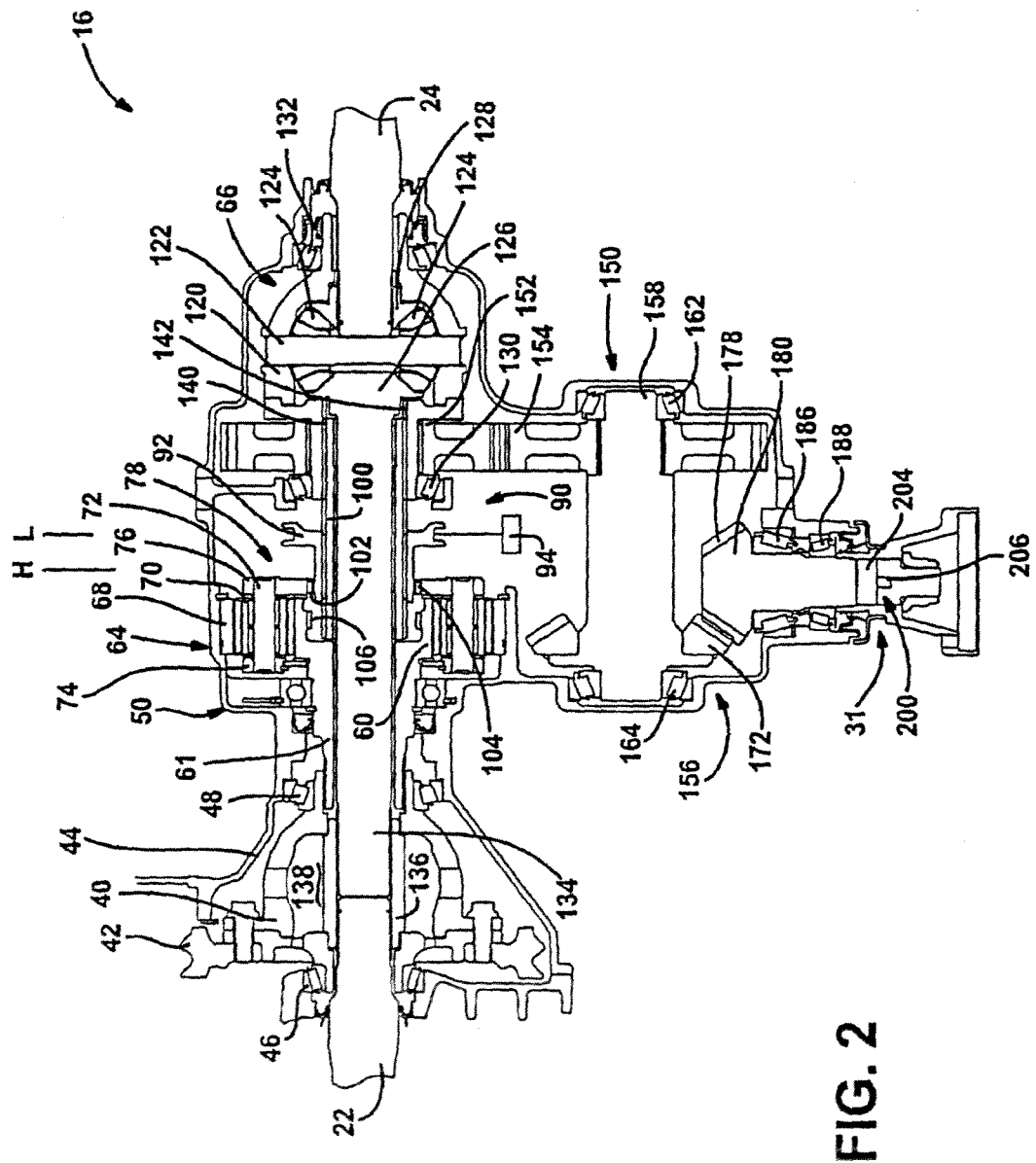
FIG. 2 is a sectional view of a two-speed power take-off unit according to the present disclosure.

With particular reference to FIG. 2 of the drawings. PTU 16 is shown to include a differential housing 40 driven by an output member 42 of transmission 14 such that both are driven by engine 12 of motor vehicle 10. Differential housing 40 is rotatably supported within a transaxle housing 44 by first and second bearing assemblies 46 and 48, respectively. Left half-shaft 22 is rotatably supported by transaxle housing 44 while right half-shaft 24 and output member 31 are rotatably supported in a PTU housing 50. PTU housing 50 is adapted to be secured to transaxle housing 44 via conventional fasteners.

Differential housing 40 is operably arranged to drive the input component of a two-speed planetary gearset 64. Planetary gearset 64 is installed between differential housing 40 and a front differential assembly 66. Planetary gearset 64 is also positioned upstream of output member 31. There are various advantages in positioning planetary gearset 64 before front differential assembly 66 and output member 31 in the drive torque transmission path through PTU 16. By performing the gear reduction provided by planetary gearset 64 prior to delivery of drive torque to front differential assembly 66, no similar torque reduction is needed at rear axle assembly 30. Furthermore, PTU 16 may be more economically manufactured by removing the gears from a conventional front differential and using housing 40 as the PTU drive member. This minimizes the necessity for new part fabrication.

Planetary gearset 64 is a simple planetary arrangement shown to include a sun gear 60, a ring gear 68 fixed to housing 50, and a set of planet gears 70 meshed with sun gear 60 and ring gear 68. Each planet gear 70 is rotatably supported on a pinion shaft 72. Each pinion shaft 72 extends between a front carrier ring 74 and a rear carrier ring 76 which are interconnected to define a planet carrier 78. Sun gear 60 is shown to be formed as part of an input shaft 61 which is fixed (i.e., splined) for common rotation with differential housing 40. As such, rotation of sun gear 60 causes planet carrier 78 to be driven at a reduced speed. It will be appreciated that planetary gearset 64 is intended to represent any other suitable planetary arrangement providing a speed reduction and corresponding torque multiplication which is capable of use in PTU 16.

PTU 16 is further equipped with a range shift mechanism 90 which includes a range sleeve 92 and range actuator 94. Range sleeve 92 is in continuous driving engagement with a transfer shaft 100. Range shift mechanism 90 is operable to axially translate range sleeve 92 on transfer shaft 100 for selectively coupling transfer shaft 100 for rotation with either of planet carrier 78 or sun gear 60. Range actuator 94 may be structured as a manually operated device, or may include a power-operated device, to perform the axial translation of range sleeve 92.

Planetary gearset 64 and range shift mechanism 90 function as a two-speed gear reduction unit that is operable to establish a first or high-range speed ratio drive connection and a second or low-range speed ratio drive connection between differential housing 40 and transfer shaft 100. As shown, the low-range speed ratio drive connection is established by coupling transfer shaft 100 to rear carrier ring 76 through range sleeve 92. In particular, rear carrier ring 76 includes internal clutch teeth 102 that are selectively engageable with external clutch teeth 104 formed on range sleeve 92 when range sleeve 92 is located in a "L" range position. As such, driven rotation of planet carrier 78 causes range sleeve 92 to drive transfer shaft 100 at a reduced speed relative to the rotary speed of differential housing 40. Likewise, the high-range speed ratio drive connection is established between transmission output member 42 and transfer shaft 100 by axially translating range sleeve 92 to a "H" range position whereat its clutch teeth 104 engage internal clutch teeth 106 formed on sun gear 60. As a result, transfer shaft 100 is driven at a direct speed ratio by differential housing 40. A neutral mode can be established when range sleeve 92 is moved to an intermediate position whereat its clutch teeth 104 are uncoupled from the clutch teeth on both planet carrier 78 and sun gear 60.

FIG. 2 further depicts front differential assembly 66 as including a differential case 120, a cross pin 122, a set of pinion gears 124, a first output side gear 126 and a second output side gear 128. Front differential assembly 66 is rotatably supported in PTU housing 50 by a third bearing assembly 130 and a fourth bearing assembly 132. Pinion gears 124 are rotatably supported on cross pin 122. Cross pin 122 is secured to differential case 120. Each pinion gear 124 is in meshed engagement with first output side gear 126 and second output side gear 128. Second output side gear 128 is rotatably fixed to the input end of right half-shaft 24. First output side gear 126 is integrally formed on the input end of an intermediate shaft 134. A separate gear may alternatively be used. An intermediate shaft sleeve 136 is fixed on the opposite or output end of intermediate shaft 134 so as to couple intermediate shaft 134 for rotation with left half-shaft 22. As shown, shaft sleeve 136 is positioned within a cavity 138 defined by differential housing 40. As previously mentioned, differential housing 40 contains no pinion gears, side gears or pinion shaft as would traditionally be present. As shown, transfer shaft 100 is rotatably supported on intermediate shaft 134.

To provide front differential assembly 66 with drive torque from the two-speed gear reduction unit, transfer shaft 100 includes external splines 140 that are engaged with internal splines 142 formed on a hub portion of differential case 120. Thus, drive torque supplied from differential housing 40 through the gear reduction unit to transfer shaft 100 is transmitted through front differential assembly 66 to intermediate shaft 134 and right half-shaft 24. As noted, intermediate shaft 134 is fixed for rotation with left half-shaft 22. As such, front differential assembly 66 operates to allow ground engaging front wheels 26 to rotate at different speeds while supplying torque to each of them.

PTU 16 further includes a PTU gearset 150 having a PTU input gear 152 fixed for rotation with transfer shaft 100 or differential housing 120, an intermediate gear 154 in meshed engagement with PTU input gear 152 and output hypoid gearset 156. Intermediate gear 154 is fixed for rotation with an offset shaft 158 that is rotatably supported in PTU housing 50 by a fifth bearing assembly 162 and a sixth bearing assembly 164. PTU output hypoid gearset 156 includes a ring gear 172 fixed for rotation with offset shaft 158 and a pinion gear 178 in meshed engagement with ring gear 172. Pinion gear 178 is integrally formed with, or mounted to, a pinion shaft 180 that is rotatably supported in PTU housing 50 by a seventh bearing assembly 186 and an eighth bearing assembly 188. Pinion shaft 180 rotates about an axis positioned perpendicular to the common axis of rotation of left and right half-shafts 22 and 24. Pinion shaft 180 may alternatively be oriented at a different angular relation without departing from the scope of the appended claims.

PTU 16 may also include a mode shift mechanism 200 that is selectively operable to place vehicle 10 in one of a two-wheel drive mode, a locked four-wheel drive mode or an on-demand four-wheel drive mode. Mode shift mechanism 200 is schematically shown to include a mode clutch 204 and a mode clutch actuator 206. Mode clutch 204 selectively drivingly couples and decouples output member 31 from pinion shaft 180 or other driven components of PTU 16, and is shown at an exemplary location in FIG. 2. It should be appreciated that mode clutch 204 may be positioned at a number of different locations within PTU 16 without departing from the scope of the present disclosure. Mode clutch actuator 206 is preferably a power-operated mechanism for controlling engagement of mode clutch 204. Specifically, mode clutch actuator 206 can fully release engagement of mode clutch 204 to disconnect driveshaft 28 from driven connection with pinion shaft 180, thereby establishing the two-wheel drive mode. Mode clutch actuator 206 can also fully engage mode clutch 204 to couple driveshaft 28 for common rotation with pinion shaft 180 to establish the locked four-wheel drive mode. If mode clutch 204 is a multi-plate friction clutch, variable engagement of the clutch pack permits torque distribution to be varied so as to establish the on-demand four-wheel drive mode.

Figure 3:
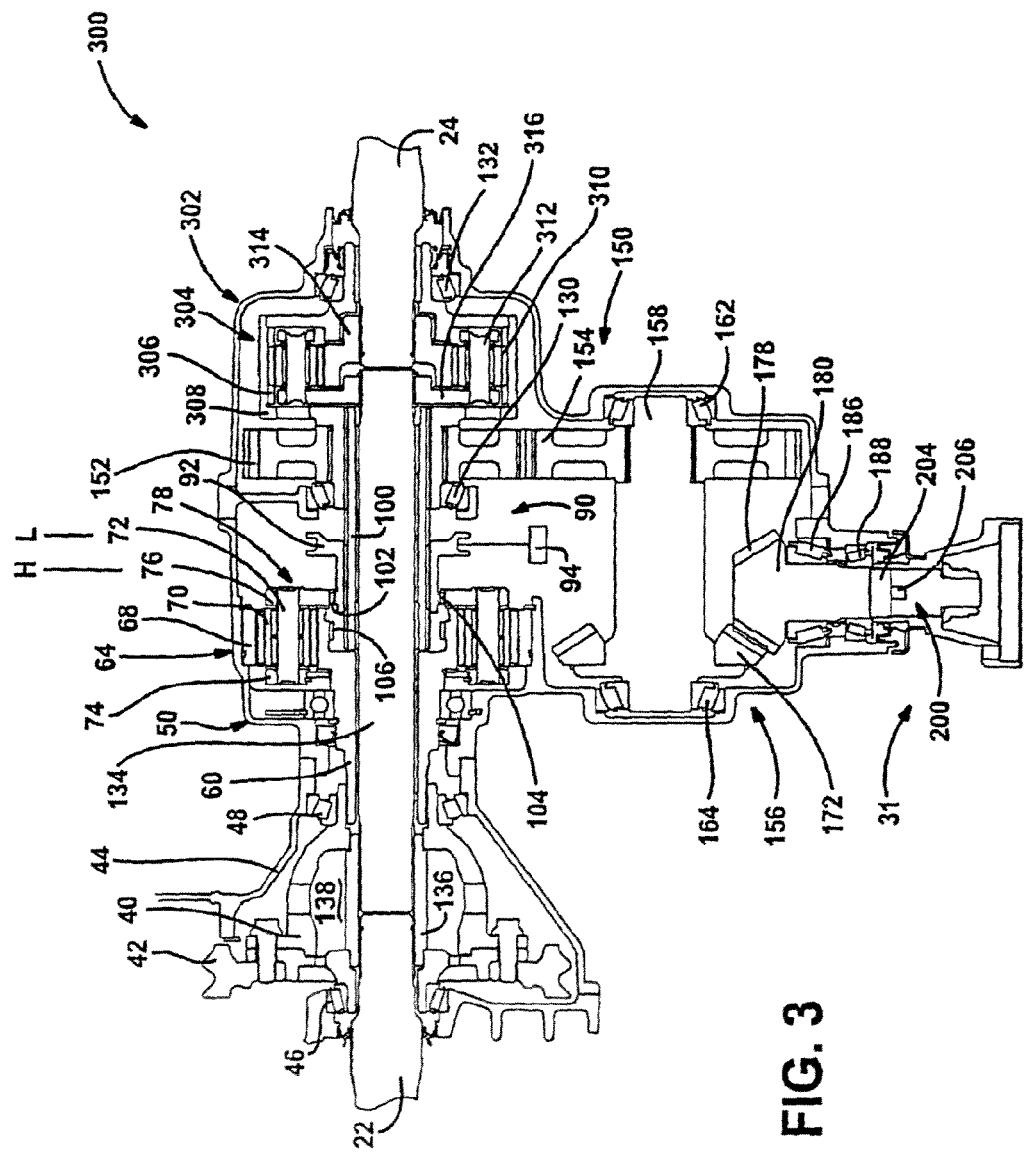
FIG. 3 is a sectional view of a two-speed power take-off unit according to a second embodiment of the present disclosure.

FIG. 3 depicts another PTU configuration identified by reference numeral 300. Many elements of PTU 300 are substantially similar to PTU 16. Accordingly, like elements will retain their previously introduced reference numerals.

PTU 300 includes a front differential assembly 302 configured as a planetary gearset 304. Planetary gearset 304 includes a ring gear 306 integrally formed inside a front differential case 308. Each pinion gear of a set of pinion gears 310 is rotatably supported on a pinion shaft 312 and meshed with a sun gear 314 and ring gear 306. A carrier 316 supports pinions shafts 312 and is fixed for rotation with the input end of intermediate shaft 134. Sun gear 314 is fixed for rotation with right half-shaft 24. Differential case 308, like differential case 120, is rotatably supported by bearings 130 and 132 and is fixed for common rotation with transfer shaft 100. Furthermore, PTU input gear 152 is fixed for rotation with differential case 308.

Figure 4:
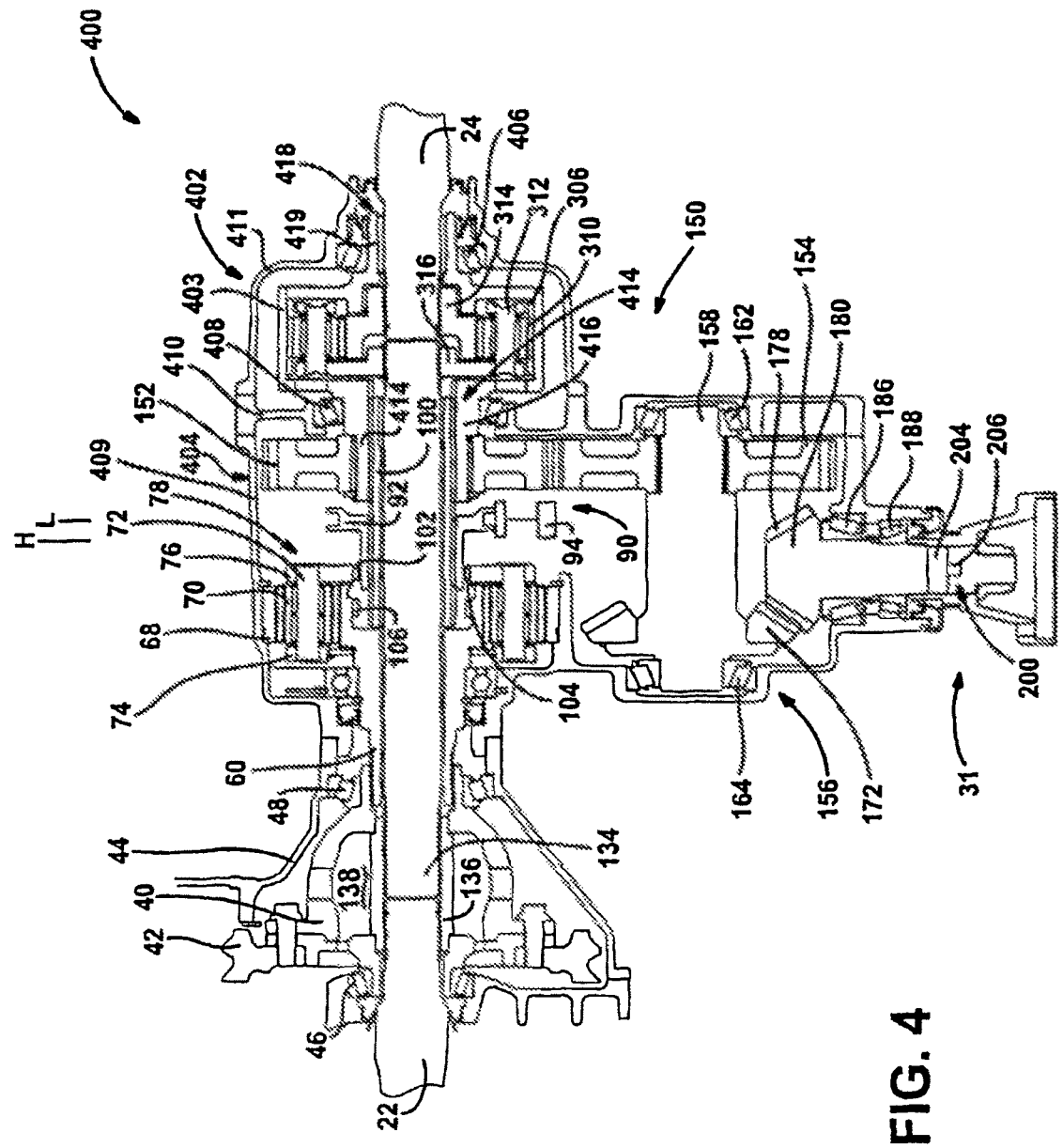
FIG. 4 is a sectional view of a two-speed power take-off unit according to a third embodiment of the present disclosure.

FIG. 4 shows another PTU configuration which is identified by reference numeral 400. PTU 400 is substantially similar to PTU 300. As such, like elements will retain their previously introduced reference numerals. PTU 400 includes a front differential assembly 402 having a differential case 403 rotatably supported in a multi-piece PTU housing assembly 404 by bearing assemblies 406 and 408. PTU housing assembly 404 includes a first housing 409, a second housing 410 and a third housing 411. Bearing assembly 408 is supported by second housing 410. Second housing 410 is axially positioned between differential assembly 402 and PTU gearset input gear 152. Differential case 403 includes a first end 414 which is fixed for common rotation with transfer shaft 100 and upon which PTU input gear 152 is also fixed for rotation. A second end 418 of differential case 403 includes a bearing support 419 in communication with bearing assembly 406. Another bearing support 416 is formed on differential case 403 and is located in alignment with second housing 410 so as to support bearing assembly 408 therebetween. This component positioning provides for improved balancing of the load on front differential assembly 402.

Figure 5:
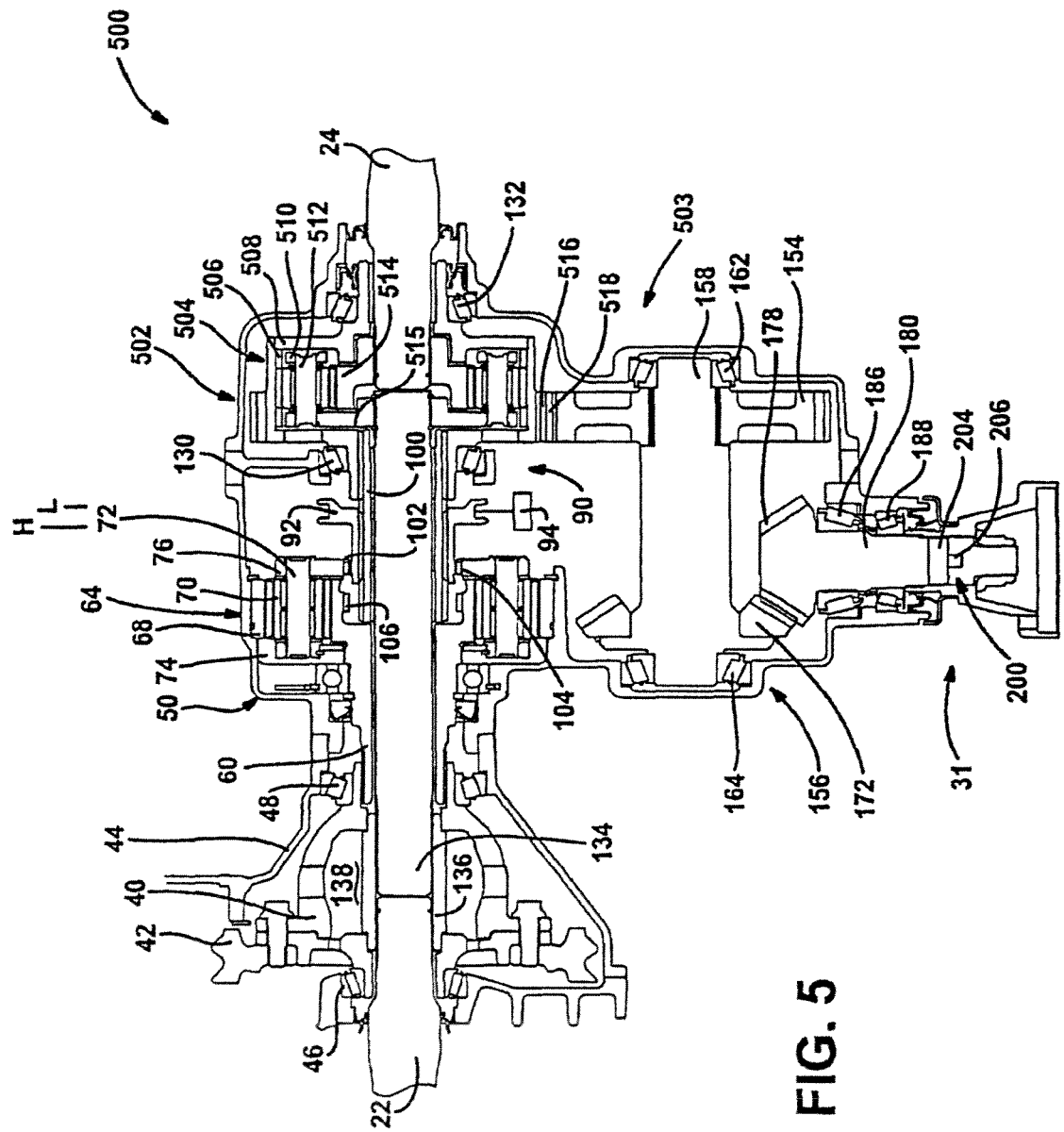
FIG. 5 is a sectional view of a two-speed power take-off unit according to a fourth embodiment of the present disclosure.

FIG. 5 shows another PTU configuration identified by reference numeral 500. PTU 500 is substantially similar to PTU 300. As such, like elements will retain their previously introduced reference numerals. PTU 500 includes a front differential assembly 502 drivingly engaged with a PTU gearset 503. Front differential assembly 502 is a planetary gearset 504. Planetary gearset 504 includes a ring gear 506 integrally formed inside a differential case 508 that is splined for rotation with transfer shaft 100. Each pinion gear of a set of pinion gears 510 is rotatably supported on a pinion shaft 512 and meshed with a sun gear 514 and ring gear 506. A carrier 515 supports pinion shafts 512 and is fixed for rotation with intermediate shaft 134. Sun gear 514 is fixed for rotation with right half-shaft 24.

Gear teeth 516 are formed on an outer perimeter portion of differential case 508. Gear teeth 516 are meshed with teeth 518 of PTU intermediate gear 154. Accordingly, differential case 508 forms a part of front differential assembly 502 with ring gear 506 and a part of PTU gearset 503 with gear teeth 516. The operation of PTU 500 is substantially similar to PTU 300 and will not be repeated.

Figure 6:
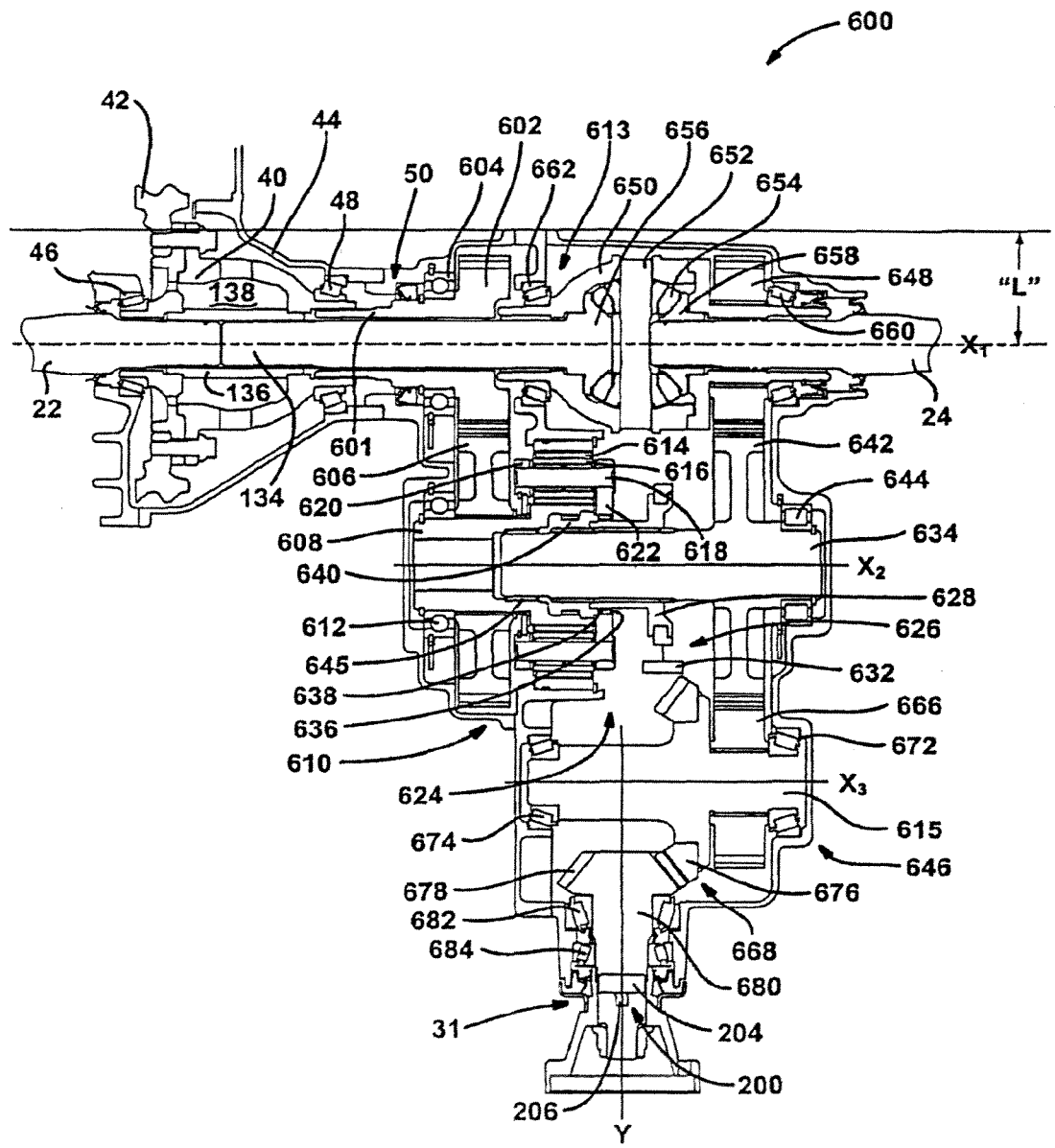
FIG. 6 is a sectional view of a two-speed power take-off according to a fifth embodiment of the present disclosure.

Another PTU configuration is shown in FIG. 6 and identified by reference numeral 600. Some elements of PTU 600 are similar to PTU 16. As such, like elements will retain their previously introduced reference numerals. As described with reference to PTU 16 and FIG. 2, PTU 600 includes differential housing 40 which is rotatably driven by transmission output member 42 such that both are rotatably driven by engine 12 of motor vehicle 10. Differential housing 40 is rotatably supported within transaxle housing 44 by first and second bearing assemblies 46 and 48, respectively.

FIG. 6 depicts differential housing 40 fixed for rotation with an input shaft 601 that is journalled on intermediate shaft 134. Input drive gear 602 is integrally formed with or rigidly secured to input shaft 601 and is rotatably supported within PTU housing 50 by a third bearing assembly 604. Furthermore, input drive gear 602 is in meshed engagement with a driven gear 606 that is fixed for rotation with a sun gear 608 of a two-speed planetary gearset 610. Sun gear 608 is rotatably supported within PTU housing 50 by a fourth bearing assembly 612. Planetary gearset 610 is positioned upstream of a front differential assembly 613 and PTU output member 31. The components of planetary gearset 610 rotate about an axis $X_2$ that is substantially parallel and intermediate of an axis $X_1$ about which half shafts 22 and 24 rotate, and an axis $X_3$ about which a PTU offset shaft 615 rotates.

There are various advantages in positioning two-speed planetary gearset 610 before front differential assembly 613 and output member 31 in the drive torque transmission path. By performing the gear reduction provided by planetary gearset 610 prior to delivering drive torque to front differential assembly 613, no similar torque reduction is needed at rear axle assembly 30. Furthermore, positioning the drive components of PTU 600 in this way reduces a dimension "L" allowing greater flexibility of gear ratios and PTU assembly packaging within the vehicle.

Planetary gearset 610 is shown to also include a ring gear 614 fixed to PTU housing 50 and a set of planet gears 616 rotatably supported on pinion shafts 618 that are meshed with sun gear 608 and ring gear 614. Each pinion shaft 618 extends between a front carrier ring 620 and a rear carrier ring 622 which are interconnected to define a planet carrier 624.

PTU 600 further includes a range shift mechanism 626 including a range sleeve 628 and a range actuator 632. Range sleeve 628 is in continuous driving engagement with a transfer shaft 634 integrally formed to include a transfer gear 642. Range actuator 632 is operable to translate range sleeve 628 between its L and H range positions for selectively coupling transfer shaft 634 to either of planet carrier 624 or sun gear 608. Range actuator 632 may be structured as a manually operated device or may include a powered actuator to perform the range shift.

Planetary gearset 610 and range shift mechanism 626 function as a two-speed gear reduction unit operable to establish the first or high-range speed ratio drive connection and second or low-range speed ratio drive connections between differential housing 40 and transfer shaft 634. As shown, the low-range speed ratio drive connection is established by coupling transfer shaft 634 to rear carrier ring 622 through range sleeve 628. In particular, rear carrier ring 622 includes internal clutch teeth 636 which can be engaged with external clutch teeth 638 formed on range sleeve 628 such that driven rotation of planet carrier 624 causes concurrent rotation of range sleeve 628 and transfer shaft 634 at the reduced speed. Likewise, the high-range speed ratio drive connection is established between output member 42 and transfer shaft 634 by axially translating range sleeve 628 until its external clutch teeth 638 engage internal teeth 640 formed on sun gear 608. A neutral mode is established when range sleeve 628 is uncoupled from both planet carrier 624 and sun gear 608.

FIG. 6 further depicts transfer shaft 634 being rotatably supported within PTU housing 50 by a fifth bearing assembly 644 and a sixth bearing assembly 645. Transfer shaft 634 and transfer gear 642 are rotatable about axis $X_2$. Transfer gear 642 is operable to continuously drive both front differential assembly 613 and a PTU gearset 646.

A driven gear 648 is in constant meshed engagement with transfer gear 642. Driven gear 648 is fixed for rotation with a differential case 650 of front differential assembly 613. Differential assembly 613 also includes a cross pin 652, a set of pinion gears 654, a first output side gear 656 and a second output side gear 658. Front differential assembly 613 is rotatably supported in PTU housing 50 by a seventh bearing assembly 660 and an eighth bearing assembly 662. Pinion gears 654 are rotatably supported on cross pin 652. Cross pin 652 is secured to differential case 650. Each pinion gear 654 is in meshed engagement with first output side gear 656 and second output side gear 658. Second output side gear 658 is fixed for rotation with the input end of right half-shaft 24. First output side gear 656 is integrally formed on the input and of intermediate shaft 134. As before, intermediate shaft sleeve 136 connects the opposite or output end of intermediate shaft 134 for rotation with left half-shaft 22. As seen, left half-shaft 22, intermediate shaft 134 and right half-shaft 24 all rotate about an axis $X_1$.

PTU gearset 646 includes a PTU input gear 666 in meshed engagement with transfer gear 642 and a PTU output hypoid gearset 668 driven by PTU offset shaft 615 which is fixed for rotation with PTU input gear 666. PTU offset shaft 615 is rotatably supported in PTU housing 50 by a ninth bearing assembly 672 and a tenth bearing assembly 674. PTU output hypoid gearset 668 includes a ring gear 676 fixed for rotation with PTU offset shaft 615 and a pinion gear 678 in meshed engagement with ring gear 676. Pinion gear 678 is integrally formed with a pinion shaft 680 rotatably supported in PTU housing 50 by an eleventh bearing assembly 682 and a twelfth bearing assembly 684. Pinion shaft 680 rotates about an axis Y positioned perpendicular to each of axes $X_1$, $X_2$, and $X_3$.

PTU 600 may also include mode shift mechanism 200 which is selectively operable to place vehicle 10 in one of the two-wheel drive mode, the locked four-wheel drive mode or the on-demand four-wheel drive mode. Mode shift mechanism 200 again includes mode clutch 204 and mode clutch actuator 206. Mode clutch 204 selectively drivingly couples and decouples PTU output member 31 from the driven components of PTU 600.

Figure 7:
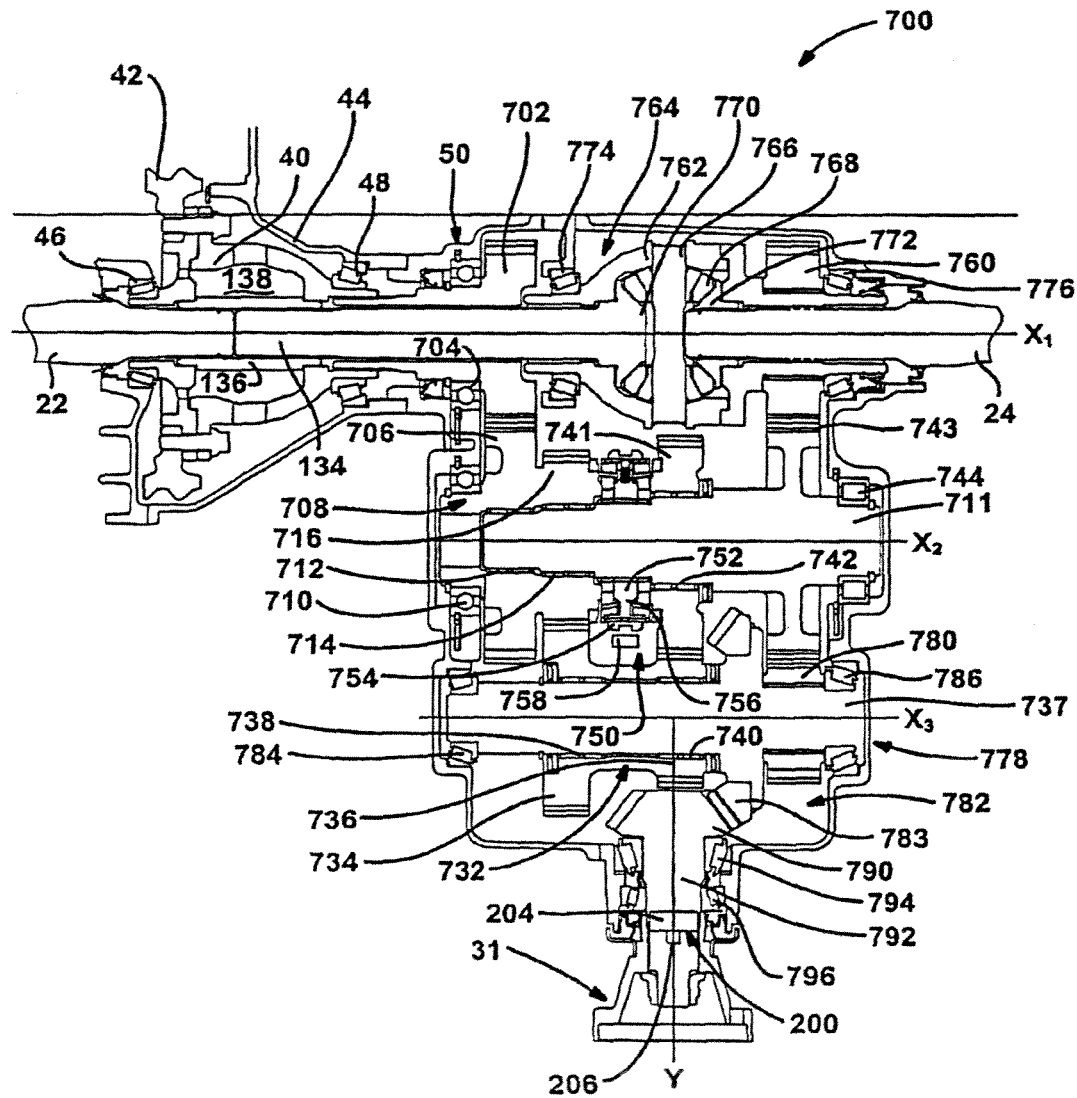
FIG. 7 is a sectional view of a two-speed power take-off according to a sixth embodiment of the present disclosure.

FIG. 7 depicts another PTU configuration which is identified by reference numeral 700. Some components of PTU 700 are substantially similar to the components of PTU 16. Like elements will retain their previously introduced reference numerals.

PTU 700 is shown to include first differential housing 40 and output member 42 arrangement previously described. First and second bearing assemblies 46 and 48 rotatably support differential housing 40 which is fixed for rotation with an input gear 702. Input gear 702 is rotatably supported within PTU housing 50 by a third bearing assembly 704. Input gear 702 is in meshed engagement with a driven gear 706 of a first compound gear 708. First compound gear 708 is rotatably supported in PTU housing 50 by a fourth bearing assembly 710 and on an intermediate transfer shaft 711 by a fifth bearing assembly 712 and a sixth bearing assembly 714. First compound gear 708 further includes a first speed gear 716.

PTU 700 further includes a second compound gear 732 having a first counter gear 734 and a second counter gear 736. Second compound gear 732 is rotatably supported on an offset PTU shaft 737 by a seventh bearing assembly 738 and an eighth bearing assembly 740. First counter gear 734 is in meshed engagement with first speed gear 716. Second counter gear 736 is in meshed engagement with a second speed gear 741. Second speed gear 741 is rotatably supported on transfer shaft 711 by a ninth bearing assembly 742. A transfer gear 743 is integrally formed with transfer shaft 711. Transfer shaft 711 is rotatably supported within PTU housing 50 by a tenth bearing assembly 744 for rotation about an axis $X_2$.

PTU 700 further includes a range shift mechanism 750 including a range hub 752, a range sleeve 754, a bi-directional synchronizer 756 and a range shift actuator 758. Range hub 752 is in continuous driving engagement with transfer shaft 711. Range sleeve 754 is internally splined for axial movement along range hub 752. Range shift actuator 758 is operable to translate range sleeve 754 and selectively couple transfer shaft 711 to either of first speed gear 716 or second speed gear 741 through range sleeve 754. Range shift mechanism 750 may be structured as a manually operated device or may include a powered actuator to perform the range shift.

Range shift mechanism 750 is operable to establish a first or high-range speed ratio drive connection and a second or low-range speed ratio drive connection between transmission output member 42 and transfer gear 743. The low-range speed ratio drive connection is established by uncoupling range sleeve 754 from first speed gear 716 while coupling range sleeve 754 to second speed gear 741. In this range position, drive torque flows through input gear 702, driven gear 706, first speed gear 716, first counter gear 734, second counter gear 736 and second speed gear 741 to transfer shaft 711. The high-range speed ratio drive connection is established between transmission output member 42 and transfer gear 743 by axially translating range sleeve 754 to engage first speed gear 716 of first compound gear 708. As shown, a neutral mode is established when range sleeve 754 is uncoupled from both second speed gear 741 and first speed gear 716.

A differential input gear 760 is in constant driven engagement with transfer gear 743. Differential input gear 760 is fixed for rotation with a differential case 762 of a front differential assembly 764. Front differential assembly 764 also includes a cross pin 766, a set of pinion gears 768, a first output side gear 770 and a second output side gear 772. Front differential assembly 764 is rotatably supported in PTU housing 50 by an eleventh bearing assembly 774 and a twelfth bearing assembly 776. Pinion gears 768 are rotatably supported on cross pins 766. Cross pins 766 are secured to differential case 762. Each pinion gear 768 is in meshed engagement with first output side gear 770 and second output side gear 772. Second output side gear 772 is fixed for rotation with the input end of right half-shaft 24. First output side gear 770 is integrally formed on the input end of intermediate shaft 134. Intermediate shaft sleeve 136 connects the opposite or output end of intermediate shaft 134 for rotation with left half-shaft 22.

A PTU gearset 778 includes a PTU input gear 780 in meshed engagement with transfer gear 743 as well as a PTU output hypoid gearset 782. A ring gear 783 of gearset 782 and input gear 780 are fixed for rotation with PTU shaft 737. PUT shaft 737 is rotatably supported in PTU housing 50 by a thirteenth bearing assembly 784 and a fourteenth bearing assembly 786. Furthermore, PTU shaft 737 rotates about axis $X_3$. Ring gear 783 of PTU output hypoid gearset 782 is in meshed engagement with a pinion gear 790. Pinion gear 790 is secured to a pinion shaft 792 rotatably supported in PTU housing 50 by a fifteenth bearing assembly 794 and a sixteenth bearing assembly 796. Pinion shaft 792 rotates about an axis Y positioned generally perpendicular to the parallel axes of rotation $X_1$, $X_2$, and $X_3$.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A power take-off unit for a motor vehicle having a powertrain and sets of first and second wheels, the power take-off unit comprising:
   a rotary input adapted to be driven by the powertrain;
   a reduction unit driven by said rotary input and having first and second output components;
   a differential assembly having a differential input and first and second differential outputs adapted to drive the set of first wheels;
   a pinion shaft;
   a rotary output adapted to drive the set of second wheels;
   a transfer assembly including a first transfer shaft, a second transfer shaft, and a transfer gearset driven by said first transfer shaft, said transfer gearset connecting said second transfer shaft and said differential input for rotation with said first transfer shaft;
   a hypoid gearset connecting said second transfer shaft for rotation with said pinion shaft;
   a range clutch operable in a first mode to couple said first output component of said reduction unit to said first transfer shaft and in a second mode to couple said second output component of said reduction unit to said first transfer shaft; and
   a mode clutch operable in a first mode to couple said pinion shaft for rotation with said rotary output and in a second mode to uncouple said pinion shaft from said rotary output.

2. The power take-off unit of claim 1 wherein said transfer gearset includes a first transfer gear coupled for rotation with said first transfer shaft, a second transfer gear coupled for rotation with said differential input and meshed with said first transfer gear, and a third transfer gear meshed with said first transfer gear and coupled for rotation with said second transfer shaft.

3. The power take-off unit of claim 2 wherein said range clutch includes a range sleeve coupled for rotation with said first transfer shaft and said range sleeve is moveable on said first transfer shaft between first and second range positions, wherein said range sleeve is operable in said first range position to couple said first output component to said first transfer shaft and establish a first speed ratio drive connection between said rotary input and said first transfer shaft, and wherein said range sleeve is operable in said second range position to couple said second output component to said first transfer shaft and establish a second speed ratio drive connection between said rotary input and said first transfer shaft.

4. The power take-off unit of claim 3 wherein said differential assembly includes a case driven by said second transfer gear, and said differential assembly further includes pinion gears rotatably supported by said case, wherein said first differential output includes a first side gear meshed with said pinion gears and said first side gear is coupled for rotation with a first output shaft for driving one of the first wheels, said rotary input surrounding said first output shaft, and wherein said second differential output includes a second side gear meshed with said pinion gears and said second side gear is coupled for rotation with a second output shaft for driving the other one of the first wheels.

5. The power take-off unit of claim 3 wherein said reduction unit is a planetary gearset having a sun gear driven by said rotary input, a non-rotary ring gear, a carrier, and planet gears rotatably supported by said carrier and meshed with said sun gear and said ring gear, wherein said range sleeve is operable in said first range position to couple said first transfer shaft to said sun gear, and wherein said range sleeve is operable in said second range position to couple said first transfer shaft to said carrier.

6. The power take-off unit of claim 3 wherein said differential assembly includes a case driven by said second transfer gear, and a ring gear driven by said case, wherein said first differential output includes a carrier coupled to a first output shaft for driving one of the first wheels, wherein said second differential output includes a sun gear coupled to a second output shaft for driving the other one of the second wheels, and wherein said differential assembly further includes pinion gears rotatably supported by said case, said pinion gears meshed with said sun gear and said ring gear.

7. The power take-off unit of claim 2 wherein said transfer assembly includes a stub shaft fixed for rotation within said differential input, said second transfer gear is coupled for rotation with said stub shaft, wherein said hypoid gearset includes a crown gear and a pinion gear, said crown gear is coupled for rotation with said second transfer shaft and said pinion gear is meshed with said crown gear, said pinion gear is fixed to said pinion shaft, and wherein said mode clutch is operable to selectively couple and uncouple said pinion shaft with said rotary output, said rotary output including a driveshaft adapted to drive an axle assembly for driving the set of second wheels.

8. The power take-off unit of claim 1 further comprising a mode shift mechanism, said mode shift mechanism including said mode clutch and a mode clutch actuator, wherein said mode clutch is operably disposed between said rotary output and said pinion shaft, wherein said mode clutch actuator is operable for shifting said mode clutch between said first and second modes, wherein said mode clutch is operable in said first mode to establish a drive connection between said rotary input and said rotary output, and wherein said mode clutch is operable in said second mode to release a drive connection between said rotary input and said rotary output.

9. The power take-off unit of claim 1 wherein said hypoid gearset includes a ring gear and a pinion gear, wherein said ring gear is fixed for rotation with said second transfer shaft, wherein said pinion gear is fixed for rotation with said pinion shaft, and wherein said ring gear is meshed with said pinion gear.

10. The power take-off unit of claim 1 wherein said reduction unit is a planetary gearset having a sun gear driven by said rotary input, a non-rotary ring gear, a carrier, and planet gears rotatably supported by said carrier, said planet gears being meshed with said sun gear and said ring gear, wherein said range clutch is operable in said first mode to couple said first transfer shaft for rotation with said sun gear, and wherein said range clutch is operable in said second mode to couple said first transfer shaft for rotation with said carrier.

11. The power take-off unit of claim 10 wherein said range clutch is operable in a third mode to uncouple said first transfer shaft from said sun gear and from said carrier.

12. The power take-off unit of claim 10 wherein said range clutch includes a range sleeve coupled for rotation with said first transfer shaft, said range sleeve is axially moveable on said first transfer shaft between first and second range positions, wherein said range sleeve is operable in said first range position to couple said sun gear to said first transfer shaft and establish a first speed ratio drive connection between said rotary input and said first transfer shaft, and wherein said range sleeve is operable in said second range position to couple said carrier to said first transfer shaft and establish a second speed ratio drive connection between said rotary input and said first transfer shaft.

13. The power take-off unit of claim 1 wherein said rotary input includes an input drive gear and an input driven gear, wherein said input drive gear is driven by the powertrain, wherein said input driven gear is coupled for rotation with said first output component of said reduction unit, and wherein said input drive gear is meshed with said input driven gear.

14. A power take-off unit for a motor vehicle having a powertrain and sets of first and second wheels, the power take-off unit comprising:
a rotary input adapted to be driven by the powertrain about a first rotary axis;
a reduction unit driven by said rotary input about a second rotary axis and having first and second output components;
a differential assembly aligned for rotation along said first rotary axis and including a differential input and first and second differential outputs adapted to drive the set of first wheels;
a transfer assembly including a first transfer shaft rotatable about said second rotary axis, a second transfer shaft rotatable about a third rotary axis, a first transfer gear driven by said first transfer shaft, a second transfer gear driving said differential input, and a third transfer gear driven by said second transfer shaft, wherein said first transfer gear is meshed with said second and third transfer gears;
a pinion shaft aligned for rotation about a fourth rotary axis that is transverse to said third rotary axis;
a hypoid gearset connecting said second transfer shaft to said pinion shaft;
a rotary output adapted to drive the set of second wheels;
a range clutch operable in a first mode to couple said first output component for rotation with said first transfer shaft and in a second mode to couple said second output component for rotation with said first transfer shaft; and
a mode clutch operable in a first mode to couple said pinion shaft for rotation with said rotary output and in a second mode to uncouple said pinion shaft from said rotary output.

15. The power take-off unit of claim 14 wherein said range clutch includes a range sleeve coupled for rotation with said first transfer shaft and said range sleeve is moveable on said first transfer shaft between first and second range positions, wherein said range sleeve is operable in said first range position to couple said first output component to said first transfer shaft and establish a first speed ratio drive connection between said rotary input and said first transfer shaft, and wherein said range sleeve is operable in said second range position to couple said second output component to said first transfer shaft and establish a second speed ratio drive connection between said rotary input and said first transfer shaft.

16. The power take-off unit of claim 15 wherein said differential assembly includes a case and pinion gears, said case is driven by said second transfer gear and said pinion gears are rotatably supported by said case, wherein said first differential output includes a first side gear meshed with said pinion gears and said first side gear is coupled for rotation with a first output shaft for driving one of the first wheels, said rotary input surrounding said first output shaft, and wherein said second differential output includes a second side gear meshed with said pinion gears and said second side gear is coupled for rotation with a second output shaft for driving the other one of the first wheels.

17. The power take-off unit of claim 14 further comprising a mode shift mechanism including said mode clutch and a mode clutch actuator, wherein said mode clutch is operably disposed between said rotary output and said pinion shaft, wherein said mode clutch actuator is operable for shifting said mode clutch between said first and second modes, wherein said mode clutch is operable in said first mode to establish a drive connection between said rotary input and said rotary output, and wherein said mode clutch is operable in said second mode to release a drive connection between said rotary input and said rotary output.

18. The power take-off unit of claim 14 wherein said hypoid gearset includes a ring gear and a pinion gear, wherein said ring gear is fixed for rotation with said second transfer shaft, wherein said pinion gear is fixed for rotation with said pinion shaft, and wherein said ring gear is meshed with said pinion gear.

19. The power take-off unit of claim 14 wherein said reduction unit is a planetary gearset having a sun gear driven by said rotary input, a non-rotary ring gear, a carrier, and planet gears rotatably supported by said carrier, said planet gears being meshed with said sun gear and said ring gear, wherein said range clutch is operable in said first mode to couple said first transfer shaft for rotation with said sun gear, and wherein said range clutch is operable in said second mode to couple said first transfer shaft for rotation with said carrier.

20. The power take-off unit of claim 19 wherein said range clutch is operable in a third mode to uncouple said first transfer shaft from said sun gear and from said carrier.

21. The power take-off unit of claim 19 wherein said range clutch includes a range sleeve coupled for rotation with said first transfer shaft, said range sleeve is axially moveable on said first transfer shaft between first and second range positions, wherein said range sleeve is operable in said first range position to couple said sun gear to said first transfer shaft and establish a first speed ratio drive connection between said rotary input and said first transfer shaft, and wherein said range sleeve is operable in said second range position to couple said carrier to said first transfer shaft and establish a second speed ratio drive connection between said rotary input and said first transfer shaft.

22. The power take-off unit of claim 14 wherein said rotary input includes an input drive gear and an input driven gear, wherein said input drive gear is driven by the powertrain, wherein said input driven gear is coupled for rotation with said first output component of said reduction unit, and wherein said input drive gear is meshed with said input driven gear.

23. A power take-off unit for a motor vehicle having a powertrain and sets of first and second wheels, the power take-off unit comprising:
a rotary input adapted to be driven by the powertrain about a second rotary axis;
a differential assembly aligned for rotation about a first rotary axis and including a differential input and first and second differential outputs adapted to drive the set of first wheels;
an offset shaft aligned for rotation about a third rotary axis, wherein said second rotary axis is positioned between said first rotary axis and said third rotary axis;
a rotary output adapted to drive the set of second wheels;
a hypoid gearset drivingly connecting said rotary output for rotation with said offset shaft;
a transfer assembly drivingly connecting said offset shaft for rotation with said differential input; and
a two-speed reduction unit driven by said rotary input about said second rotary axis and operable for establishing first and second speed ratio drive connections between said rotary input and said transfer assembly.

24. The power take-off unit of claim 23 wherein said two-speed reduction unit includes a planetary gearset and a range clutch, wherein said planetary gearset is driven by said rotary input, and wherein said range clutch is operable in a first range position to establish said first speed ratio drive connection between said planetary gearset and said transfer assembly and is operable in a second range position to establish said second speed ratio drive connection between said planetary gearset and said transfer assembly.

25. The power take-off unit of claim 24 wherein said transfer assembly includes a transfer shaft and a transfer mechanism driven by said transfer shaft, wherein said transfer mechanism couples said differential input and said offset shaft for rotation with said transfer shaft.

26. The power take-off unit of claim 24 wherein said planetary gearset includes an input component driven by said rotary input, and an output component driven at a reduced speed relative to said input component, wherein said range clutch is operable in said first range position to couple said input component to said transfer assembly and establish a high-range drive connection between said rotary input and said transfer assembly, and wherein said range clutch is operable in said second range position to couple said output component to said transfer assembly and establish a low-range drive connection between said rotary input and said transfer assembly.

27. The power take-off unit of claim 23 further comprising a pinion shaft driven by said hypoid gearset and a mode clutch for selectively coupling and uncoupling said rotary output and said pinion shaft.

28. The power take-off unit of claim 23 further comprising a mode clutch for selectively coupling and uncoupling said rotary output and said hypoid gearset.

29. A power take-off unit for a motor vehicle having a powertrain and sets of first and second wheels, the power take-off unit comprising:
  a rotary input adapted to be driven by the powertrain;
  a differential having a differential input and first and second differential outputs adapted to drive the set of first wheels;
  a rotary output adapted to drive the set of second wheels;
  a hypoid gearset driving a pinion shaft;
  a transfer assembly driving said differential input and said hypoid gearset;
  a two-speed reduction unit including a planetary gearset and a range clutch, said planetary gearset being driven by said rotary input, said range clutch being operable in a first mode to establish a first speed ratio drive connection between said planetary gearset and said transfer assembly and being further operable in a second mode to establish a second speed ratio drive connection between said planetary gearset and said transfer assembly; and
  a mode clutch for selectively coupling and uncoupling said pinion shaft and said rotary output.

30. The power take-off unit of claim 29 wherein said transfer assembly includes a transfer shaft, wherein said hypoid gearset is driven by said transfer shaft, and wherein said transfer assembly further includes a transfer gearset coupling said differential input and said hypoid gearset for rotation with said transfer shaft.

* * * * *